United States Patent
Peacock

[19]

[11] Patent Number: 5,989,500
[45] Date of Patent: Nov. 23, 1999

[54] REACTOR HEAT EXCHANGE SYSTEM

[75] Inventor: Richard Peacock, Missouri City, Tex.

[73] Assignee: Phillips Petroleum Company, Bartlesville, Okla.

[21] Appl. No.: 08/887,024

[22] Filed: Jul. 2, 1997

[51] Int. Cl.⁶ .................................................. C08F 2/02
[52] U.S. Cl. .......................... 422/138; 422/135; 422/200; 422/201
[58] Field of Search ..................................... 422/135, 138, 422/200, 201

[56] References Cited

U.S. PATENT DOCUMENTS

| 2,664,346 | 12/1953 | Mayhew | 422/201 |
|---|---|---|---|
| 3,679,651 | 7/1972 | Kii et al. | 260/93.5 S |
| 3,909,207 | 9/1975 | Bir | 23/285 |
| 4,321,234 | 3/1982 | Ohsaki et al. | 422/200 |
| 4,525,482 | 6/1985 | Ohsaki et al. | 422/200 |
| 4,594,227 | 6/1986 | Ohsaki et al. | 422/201 |
| 4,632,587 | 12/1986 | Vollhardt | 422/201 |
| 4,714,592 | 12/1987 | Zanma et al. | 422/201 |
| 4,882,283 | 11/1989 | Gentry | 435/316 |
| 4,985,208 | 1/1991 | Sugawara et al. | 422/135 |

FOREIGN PATENT DOCUMENTS

| 0295519 | 12/1988 | European Pat. Off. |
| 1570283 | 2/1970 | Germany . |
| 827749 | 2/1960 | United Kingdom . |

*Primary Examiner*—Timothy McMahon
*Attorney, Agent, or Firm*—Richmond, Hitchcock, Fish & Dollar

[57] ABSTRACT

In a reactor of the type having a vessel, an agitator for agitating the contents of the vessel, and a heat exchange system within the vessel, the improvement wherein the heat exchange system comprises: a first substantially annular header which comprises pipe; a second substantially annular header comprising pipe and being spaced from the first header; a third substantially annular header comprising pipe and being spaced from the first header and adjacent to the second header; a first set of tubes extending between and connecting the first header and the second header; and a second set of tubes extending between and connecting the first header and the third header.

7 Claims, 4 Drawing Sheets

REACTOR HEAT EXCHANGE SYSTEM

BACKGROUND OF THE INVENTION

This invention relates to a heat exchange system in a reactor such as a polymerization reactor.

Some polymerization reactions produce a considerable amount of heat. Heat exchange systems must be placed in the reactor to cool the contents of the reactor. A prior heat exchange system comprises top and bottom headers and a plurality of tubes extending between and connecting the headers. An axial or partially axial flow agitator with impellers produces a vertical flow pattern. It can be downward to the reactor bottom where the flow pattern turns and flows upward outside the impellers. Some flow is between the tubes and the reactor wall, and some is between the impellers and the tubes. Dead spots with low or no flow are observed in between the tubes. This cools the reactor contents excessively in these areas, leading to undesirably high viscosities of portions of the final product and a consequent adverse effect on the homogeneity of the final product. It also leads to poor heat transfer between the coolant in the tubes and the polymer solution. Further, these dead spots represent areas where mixing or blending of the reactor contents is inhibited and, hence, there is not thorough mixing of the reactants within the reactor.

SUMMARY OF THE INVENTION

It is, therefore, an object of the invention to provide an improved heat exchange system for a reactor which achieves improved flow patterns, more heat transfer, as well as more uniform heat transfer.

It is a further object of the invention to provide a reactor having an improved heat exchange system wherein the improved heat exchange system allows for improved fluid velocity around the heat exchange tubes and more uniform distribution of reactants to produce enhanced mixing and quicker reactions or blending within the reactor.

The above object is realized by an improved heat exchange system in a reactor of the type having a vessel and an agitator for agitating the contents of the vessel, wherein the heat exchange system comprises: a first substantially annular header which comprises pipe; a second substantially annular header comprising pipe and being spaced from the first header; a third substantially annular header comprising pipe and being spaced from the first header and adjacent to the second header; a first set of tubes extending between and connecting the first header and the second header; and a second set of tubes extending between and connecting the first header and the third header.

According to a preferred embodiment, a fourth header is also provided which is positioned between the first and second set of tubes and adjacent to the second and third header. A third set of tubes extends between and connects the fourth header and the first header.

The invention reduces or eliminates the problem of dead spots around the interior tubes between the inner and outer tubes. Excessive cooling of stagnant areas is avoided, a more homogeneous product is produced, and higher heat removal is achieved.

DETAILED DESCRIPTION OF THE INVENTION

Figure 1:
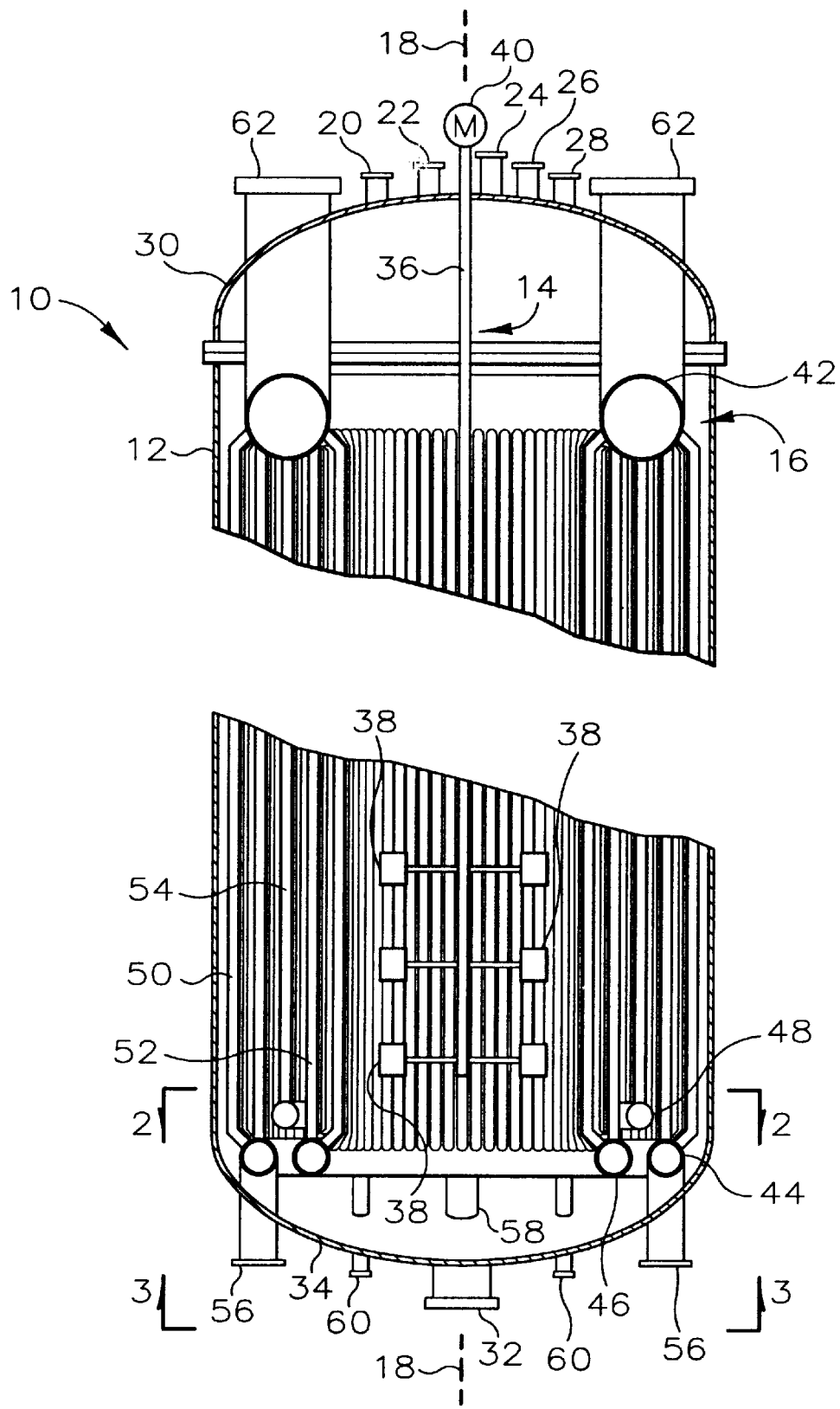
FIG. 1 is a cross-sectional view of a reactor having a heat exchange system in accordance with a first embodiment of the invention.

Referring to FIG. 1, there is shown a reactor 10 which comprises a vessel 12, an agitator 14, and a heat exchange system 16. This particular reactor is disclosed as being used to polymerize styrene and butadiene. However, the invention is applicable to other reactions which require cooling or heating by a heat exchange system.

Vessel 12 has a longitudinal axis 18 that is vertically oriented. Vessel 12 further has inlets 20, 22, 24, 26, and 28 at its upper end 30 and an outlet 32 at its lower end 34. Solvent, coupling agent, styrene, initiator, and butadiene can be introduced into vessel 12 through inlets 20, 22, 24, 26, and 28, respectively. Product, styrene-butadiene copolymer in solution, is withdrawn from vessel 12 through outlet 32.

Agitator 14 comprises a shaft 36, which is aligned with longitudinal axis 18, and three impellers 38. Fewer or more impellers could be employed if desired. Agitator 14 is preferably an axial flow or partially axial flow agitator driven by a motor 40 at 30 to 350 r.p.m., which could be lower or higher with varying viscosity of the polymer solution.

Heat exchange system 16 comprises: an upper substantially annular header 42 which comprises pipe; a lower substantially annular header 44 comprising pipe and spaced from header 42; a lower substantially annular header 46 comprising pipe and being spaced from header 42 and adjacent to header 44; an intermediate header 48 comprising pipe and being adjacent to but vertically offset from and above headers 44 and 46; a set of tubes 50 extending between and connecting header 42 and header 44; a set of tubes 52 extending between and connecting header 42 and header 46; and a set of tubes 54 extending between and connecting header 42 and header 48. Header 42 surrounds longitudinal axis 18 at a position near upper end 30, and headers 44, 46, and 48 surround longitudinal axis 18 at positions near lower end 34. Tubes 50 comprise two rows of tubes where the tubes of each row are annularly spaced. Similarly, tubes 52 comprise two rows of tubes where the tubes of each row are annularly spaced. Tubes 54 comprise one row of annularly spaced tubes. Tubes 50, 52, and 54 are substantially vertically oriented so as to be substantially parallel to longitudinal axis 18. As can be seen from FIG. 1, header 48 is positioned between tubes 50 and 52.

Header 44 has two inlets 56 spaced 180° apart, and header 46 similarly has two inlets (only one of which is partially visible in FIG. 1) 58 spaced 180° apart. Header 48 has four inlets (only two of which are visible in FIG. 1) 60 spaced 90° apart. Header 42 has two outlets 62 spaced 180° apart. Therefore, coolant flows upwardly through tubes 50, 52, and 54 from headers 44, 46, and 48 to header 42. Suitable coolants include a hydrocarbon, such as n-pentane, and water.

Fluid in vessel 12 is forced downward by the rotating impellers 38. The fluid flows to the bottom of vessel 12 and then turns and flows upward outside impellers 38. Fluid flows between headers 44 and 46 and then into and around header 48. This causes fluid to flow between tubes 50 and 52, as well as between the tube rows of tubes 50 and 52. Fluid continues to flow upwardly to the top of vessel 12, where it then flows back down in response to the rotation of impellers 38. Stagnant areas are minimized and fluid velocity is maximized among the interior tubes to produce a desirably homogeneous product as previously discussed. In addition, blend time is minimized by the invention.

Figure 2:
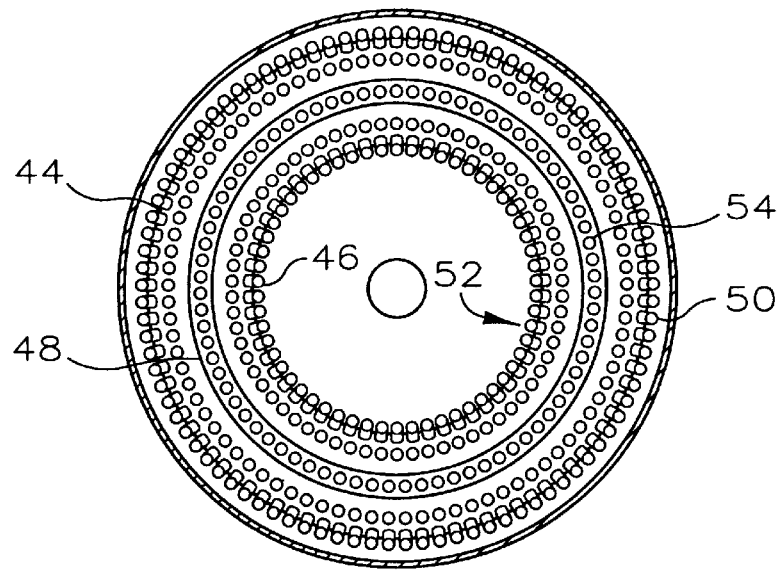
FIG. 2 is a cross-sectional view of the reactor of FIG. 1 as viewed along line 2—2.

Referring to FIG. 2, this view more clearly shows the arrangement of tubes 50, 52, and 54, and more particularly the annular spacing of the tubes in each tube row. Headers 44, 46, and 48 can also be seen to be annular in shape.

Figure 3:
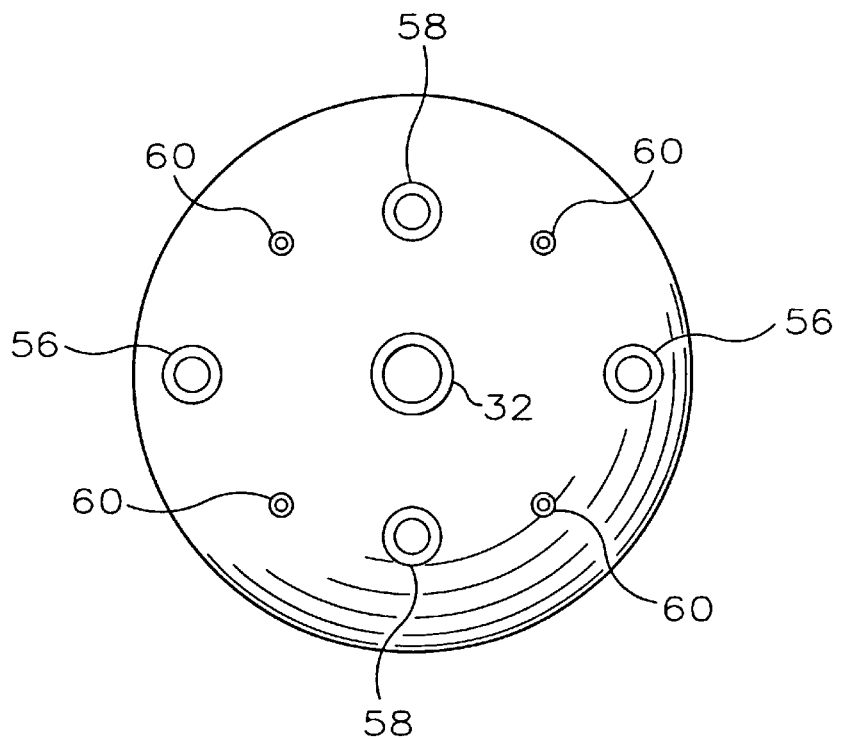
FIG. 3 is a view of the reactor of FIG. 1 as viewed along line 3—3.

Referring to FIG. 3, this view more clearly shows the arrangement of inlets 56, 58, and 60. Other arrangements are, of course, possible.

Figure 4:
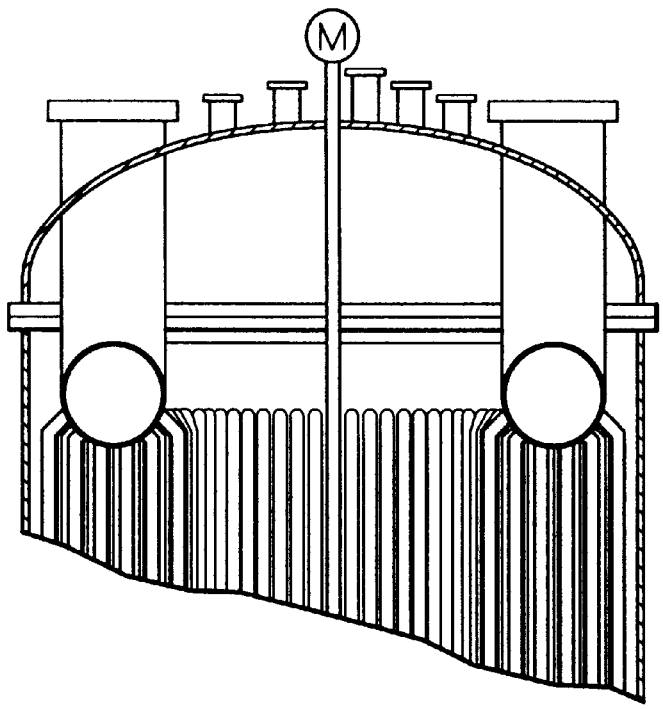
FIG. 4 is a cross-sectional view of a reactor having a heat exchange system in accordance with a second embodiment of the invention.
Figure 4:
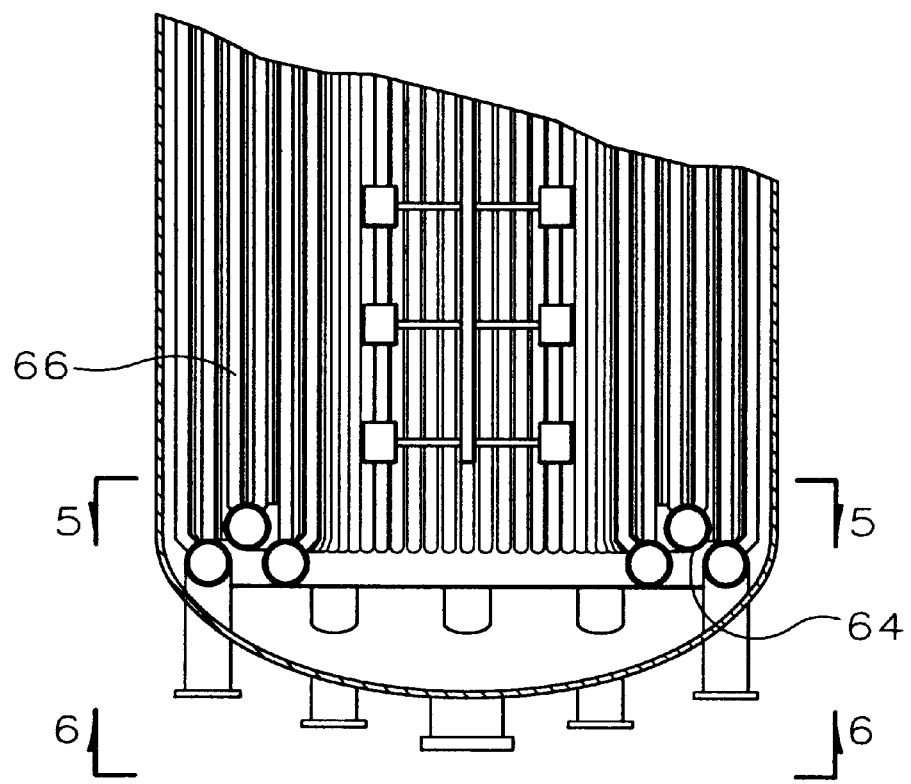

Referring to FIG. 4, the illustrated second embodiment is similar in all respects to the first embodiment of FIG. 1, except for a larger intermediate header, header 64, and an associated set of tubes 66 which has two rows of tubes where the tubes of each row are annularly spaced. This provides an extra row of tubes as compared to the embodiment of FIG. 1, and therefore provides more heat exchange area and more effective cooling of the fluid in the vessel in some cases.

Figure 5:
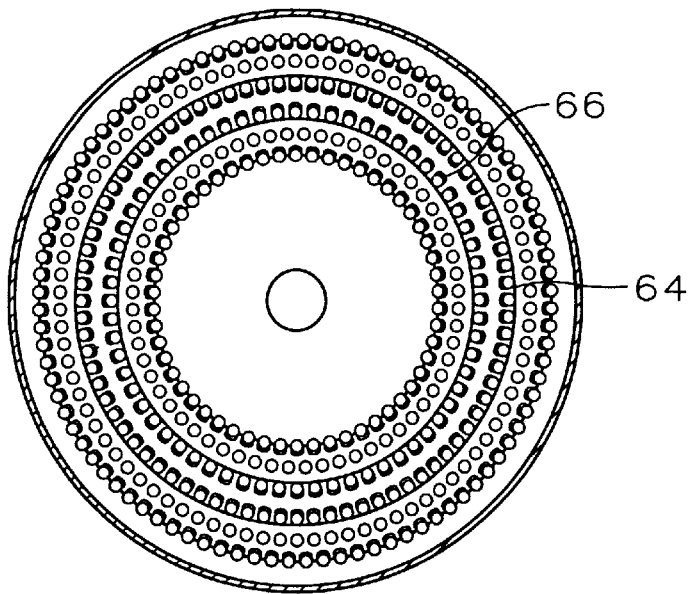
FIG. 5 is a cross-sectional view of the reactor of FIG. 4 as viewed along line 5—5.
Figure 6:
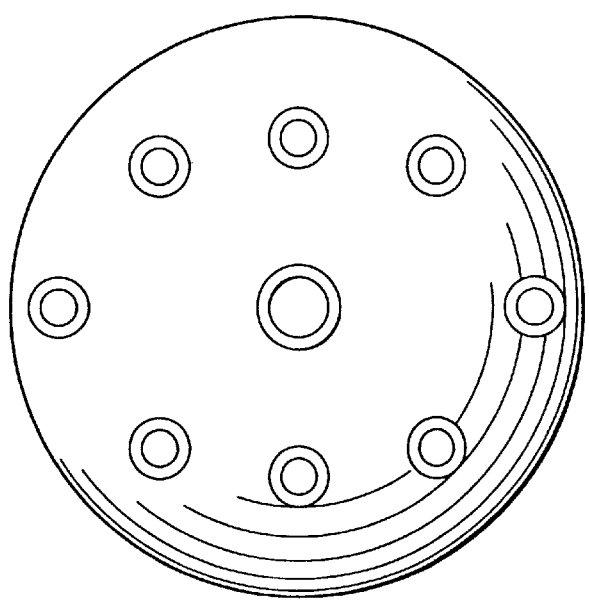
FIG. 6 is a view of the reactor of FIG. 4 as viewed along line 6—6.

Referring to FIGS. 5 and 6, these cross-sectional views of the embodiment of FIG. 4 are similar to FIGS. 2 and 3 for the embodiment of FIG. 1.

Obviously, many modifications and variations of the present invention are possible in light of the above teachings. For example, according to broad aspects of the invention, the intermediate header could be eliminated. Or, the upper header could be split into multiple headers. Finally, the coolant inlet piping could be changed. It is, therefore, to be understood␣the within the scope of the appended claims, the invention can be practiced otherwise than as specifically described.

That which is claimed is:

1. In a reactor of the type having a vessel having a vertically oriented longitudinal axis, an upper end and a lower end, an agitator for agitating the contents of the vessel, and a heat exchange system within the vessel, the improvement wherein the heat exchange system comprises:

a first substantially annular header comprising pipe and surrounding the longitudinal axis of the vessel near the upper end;

a second substantially annular header comprising pipe and surrounding the longitudinal axis of the vessel near the lower end;

a third substantially annular header comprising pipe and surrounding the longitudinal axis of the vessel near the lower end and positioned adjacent to the second header so that stagnant areas of a fluid medium flowing within the vessel are minimized;

a first set of tubes having a longitudinal axis and an exterior surface and extending between and connecting the first header and the second header so that the longitudinal axis of the second set of tubes is substantially parallel to the longitudinal axis of the vessel, wherein the exterior surface of the first set of tubes contacts said fluid medium and said fluid medium flows substantially parallel to the longitudinal access of the first set of tubes; and a second set of tubes having an exterior surface and extending between and connecting the first header and the third header so that the longitudinal axis of the second set of tubes is substantially parallel to the longitudinal axis of the vessel, wherein the exterior surface of the second set of tubes contacts said fluid medium and said fluid medium flows substantially parallel to the longitudinal access of the second set of tubes.

2. In a reactor as recited in claim 1, further comprising: a fourth substantially annular header comprising pipe and surrounding the longitudinal axis of the vessel near the lower end and positioned between the first set of tubes and second set of tubes and being adjacent to the second and third headers so that stagnant areas of fluid within the vessel are minimized; and a third set of tubes having a longitudinal axis and an exterior surface and extending between and connecting the first header and the fourth header so that the longitudinal axis of the third set of tubes is substantially parallel to the longitudinal axis of the vessel, wherein the exterior surface of the third set of tubes contacts said fluid medium and said fluid medium flows substantially parallel to the longitudinal axis of the first set of tubes.

3. In a reactor as recited in claim 1 wherein the fourth header is vertically offset from and above the second and third headers.

4. In a reactor as recited in claim 3 wherein the first set of tubes comprises two rows of tubes where the tubes of each row are annularly spaced, the second set of tubes comprises two rows of tubes where the tubes of each row are annularly spaced, and the third set of tubes comprises one row of annularly spaced tubes.

5. In a reactor as recited in claim 4 wherein the third set of tubes further comprises a second row of annularly spaced tubes.

6. In a reactor as recited in claim 5 wherein the agitator is an axial flow agitator.

7. In a reactor as recited in claim 5 wherein the agitator is a partially axial flow agitator.

* * * * *